United States Patent [19]
Holzer

[11] 3,774,429
[45] Nov. 27, 1973

[54] METHOD OF AND APPARATUS FOR PRODUCING CONICALLY SHAPED TUBES

[75] Inventor: Helmut Holzer, Freiburg, Switzerland

[73] Assignee: Polytype AG Freiburg, Switzerland

[22] Filed: Mar. 7, 1972

[21] Appl. No.: 232,557

[30] Foreign Application Priority Data
Mar. 8, 1971 Sweden.............................. 2936/71

[52] U.S. Cl............................ 72/56, 72/63, 72/370
[51] Int. Cl............................................ B21d 51/10
[58] Field of Search.......................... 72/56, 63, 370

[56] References Cited
UNITED STATES PATENTS

| | | | |
|---|---|---|---|
| 3,534,573 | 10/1970 | Hall ...................................... | 72/370 |
| 3,201,967 | 8/1965 | Balamuth et al...................... | 72/359 |
| 2,382,045 | 8/1945 | Flowers................................. | 72/453 |
| 1,985,833 | 12/1934 | Lampart .............................. | 72/347 |
| 2,390,553 | 12/1945 | Pittner............................. | 113/120 M |
| 2,696,184 | 12/1954 | Demarest................................ | 72/63 |
| 2,385,083 | 9/1945 | Kemerer................................ | 72/63 |

*Primary Examiner*—Richard J. Herbst
*Attorney*—David Toren et al.

[57] ABSTRACT

In forming conically or frusto-conically shaped tubes, the tubes are pressed by a transferring device onto an axially extending frusto-conically shaped hollow mandrel and vibrations are generated and passed into the mandrel through a hydraulic system and a pressure chamber attached to the mandrel. The vibrations in the mandrel effect the conical widening action on the tube. The vibrations can be produced by a hydraulically or pneumatically controlled electromagnet, by controlled pumps and valves, or by a device for producing controlled explosions. Further, axially extending grooves or ribs can be formed in the tube by providing corresponding surfaces on the exterior surface of the mandrel.

11 Claims, 2 Drawing Figures

PATENTED NOV 27 1973　　　　　　　　　　　3,774,429

METHOD OF AND APPARATUS FOR PRODUCING CONICALLY SHAPED TUBES

SUMMARY OF THE INVENTION

The present invention is directed to a method of and apparatus for producing conical tubes and, more particularly, it concerns the use of vibrations in forming the tubes.

Ordinary tubes of aluminum, tin and other materials are normally produced on extruders in approximately cylindrical form. The cylindrical shape of such tubes and similar containers facilitates their processing in lathe and lacquering and lithographing machines.

The storage and transportation of such cylindrically shaped tubes has proved to be disadvantageous because of the space required for the individual tubes and also because the tubes are easily deformed.

Accordingly, it is the primary object of the present invention to shape such tubes so that the problems experienced in storing and transporting them are overcome.

Therefore, in accordance with the present invention, the tubes are pressed in the axial direction onto a hollow conically shaped mandrel and vibrations are introduced into the mandrel so that cylindrically shaped tubes and similar containers are converted into frusto-conically shaped members as they are pressed onto the mandrel and widened by the action of the vibrations introduced into the mandrel. Due to the conically expanding action effected on the tubes, they can be nested one within the other providing a particularly space-saving effect for storage and transportation purposes. Moreover, tubes conically expanded in this manner become less sensitive to deformation.

Internally and externally lacquered and lithographed tubes are suitable for the conically widening action of the present invention. Tubes and other cylindrical containers formed of metal or materials with sufficient elongation at low elasticity can be conically widened.

As tubes and similar containers are being conically widened, it is also possible to alter the surface configuration of the tube, such as providing the tubes with longitudinally extending grooves or ribs formed by providing similarly shaped surfaces on the exterior surface of the mandrel. By providing grooves or ribs on the exterior surface of the tubes they become easier to grip and provide a surface configuration more resistant to deformation.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE INVENTION

Figures 1, 2:
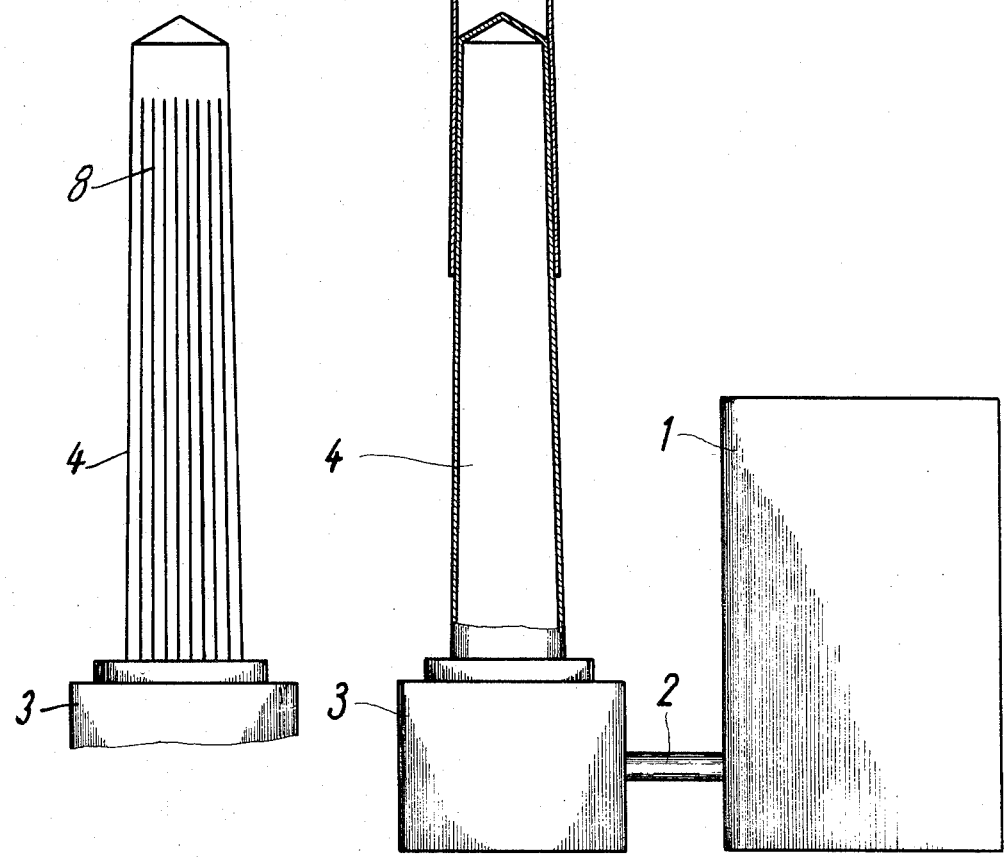
FIG. 1 is an elevational view, partly in section, of a device incorporating the present invention.
FIG. 2 is an elevational view of an expanding mandrel for forming longitudinally or axially extending grooves in a tube.

In the drawing a vibration generating member 1 is connected by a hydraulic system 2 to a pressure chamber 3. Flanged to and extending axially outwardly from the pressure chamber is a frusto-conically shaped hollow expanding mandrel 4 closed at its end spaced outwardly from the pressure chamber 3. A cylindrically shaped tube 5, open at one end and at least partly closed at the other end by a shoulder 7, is pressed onto the expanding mandrel in the axial direction thereof by a transferring device 6. As the tube 5 is positioned on the mandrel 4 until its shoulder 7 contacts the closed end of the mandrel, its cylindrically shaped surface is converted into a frusto-conically shaped one.

The vibration generating member can consist of a hydraulically or pneumatically controlled electromagnet or of an arrangement of controlled pumps and valves. Since such devices for generating vibrations are well known, details of their construction have not been illustrated. Further, a device for producing controlled explosions can also be used as the vibration generating member 1.

In FIG. 2 a plurality of laterally spaced axially extending thin wire-like ribs 8 are formed on the exterior surface of the mandrel for providing a similarly shaped surface configuration on the tube 5. Alternatively, in place of ribs 8 the surface of the mandrel can be formed with grooves cut or engraved into its surface for providing a similar surface on the tube 5.

The following is a description of the manner in which the apparatus shown in FIG. 1 operates.

The hollow frusto-conically shaped expanding mandrel 4 is vibrated by pressure shocks of high frequency imparted from the vibration generating member 1 through the hydraulic system 2 and the pressure chamber 3. The amplitude of the vibrations is selected so that the material of the mandrel 4 withstands any elongation or deformation in a permanently elastic manner, while the material in the tube 5 is such that it is plastically deformed due to the vibrating action and the frusto-conical configuration of the mandrel. As the tube 5 is pressed axially onto the hollow expanding mandrel 4 by the transferring device 6, it is widened into a frusto-conical configuration with each vibration imparted to the mandrel and the widening action continues until the shoulder 7 of the tube 5 contacts the closed end of the mandrel 4.

As shown in FIG. 2, the ribs 8 on the mandrel are impressed into the inner surface of the tube and the surface of the tube is then provided with a configuration similar to that on the mandrel. As explained above, in place of the ribs 8 grooves can be formed in the mandrel and a grooved pattern is then provided in the surface of the tube as it is expanded while it is pressed onto the mandrel.

While specific embodiments of the invention have been shown and described in detail to illustrate the application of the inventive principles, it will be understood that the invention may be embodied otherwise without departing from such principles.

What is claimed is:

1. Method of producing frusto-conically shaped tubes and similar containers from cylindrically shaped tubes comprising forming a frusto-conically shaped hollow expanding surface, at least partially closing one end of the tube to be deformed and inserting the opposite end of the tube onto the expanding surface, axially pressing the tube onto the expanding surface by applying a pressing force against the at least partially closed end of the tube with the inner surface of the tube contacting the expanding surface and its outer surface being free, vibrating the expanding surface with high frequency pressure shocks and controlling the amplitude of the vibration so that the expanding surface withstands any elongation and deformation in a permanently elastic manner as the tube is plastically deformed due both to the vibrating action and the frustoconical configuration of the expanding surface.

2. Apparatus for forming cylindrically shaped tubes into frusto-conically shaped tubes consisting of a frusto-conically shaped axially elongated hollow expanding mandrel closed at its smaller diameter end, means for pressing a cylindrically shaped tube over said mandrel by placing the leading end of the tube on the smaller diameter end of the mandrel and by exerting the pressing force in the axial direction of said mandrel against the trailing end of the tube so that the inner surface of the tube contacts the mandrel and its outer surface is free, and means for generating vibrations and inducing the vibrations into said mandrel at its end opposite the small diameter end for widening the tube pressed thereon.

3. Apparatus, as set forth in claim 2, wherein said means for generating vibrations and introducing vibrations comprises a pressure chamber fixed to said mandrel at the end thereof opposite the smaller diameter end a vibration generator, and a hydraulic system connecting said vibration generator to said pressure chamber.

4. Apparatus, as set forth in claim 3, wherein said vibration generator comprises a hydraulically controlled electromagnet.

5. Apparatus, as set forth in claim 3, wherein said vibration generator comprises a pneumatically controlled electromagnet.

6. Apparatus, as set forth in claim 3, wherein said vibration generator comprises controlled pumps and valves.

7. Apparatus, as set forth in claim 3, wherein said vibration generator comprises means for producing controlled explosions.

8. Apparatus, as set forth in claim 2, wherein said mandrel comprises a flange at one end for connecting said mandrel to said pressure chamber.

9. Apparatus, as set forth in claim 2, wherein said means for pressing a tube over said mandrel comprises a transferring device for pressing the tube axially over said mandrel.

10. Apparatus, as set forth in claim 2, wherein said mandrel includes means forming alternating axially extending lands and grooves on the exterior surface of said mandrel.

11. Apparatus, as set forth in claim 10, wherein said means on the exterior surface of said mandrel comprises thin laterally spaced wire-like ribs fixed to the exterior surface of said mandrel for forming longitudinally extending ribs in the tube as it is pressed on said mandrel and is expanded by said vibrating means.

* * * * *